US008554027B2

(12) United States Patent  
Tokushima

(10) Patent No.: US 8,554,027 B2  
(45) Date of Patent: Oct. 8, 2013

(54) OPTICAL SWITCH

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 13/141,362

(22) PCT Filed: Dec. 25, 2009

(86) PCT No.: PCT/JP2009/007256  
§ 371 (c)(1),  
(2), (4) Date: Jun. 22, 2011

(87) PCT Pub. No.: WO2010/073704  
PCT Pub. Date: Jul. 1, 2010

(65) Prior Publication Data  
US 2011/0255826 A1    Oct. 20, 2011

(30) Foreign Application Priority Data  
Dec. 26, 2008    (JP) .................................. 2008-332422

(51) Int. Cl.  
*G02B 6/26*        (2006.01)
(52) U.S. Cl.  
USPC ............................................................ 385/16
(58) Field of Classification Search  
None  
See application file for complete search history.

(56) References Cited

U.S. PATENT DOCUMENTS

| 8,355,606 | B2 * | 1/2013 | Englund et al. ................. 385/16 |
| 2004/0041663 | A1 * | 3/2004 | Uchimura et al. ............. 333/135 |
| 2011/0293217 | A1 * | 12/2011 | Tokushima ..................... 385/14 |

FOREIGN PATENT DOCUMENTS

| JP | 2001056454 A | 2/2001 |
| JP | 2002303836 A | 10/2002 |
| JP | 2004295113 A | 10/2004 |
| WO | 2009110262 A | 9/2009 |

OTHER PUBLICATIONS

International Search Report for PCT/JP2009/007256 mailed Jan. 26, 2010.  
T. Fujisawa et al., "Finite-Element Modeling of Nonlinear Mach-Zehnder Interferometers Based on Photonic-Crystal Waveguides for All-Optical Signal Processing", Journal of Lightwave Technology, vol. 24, No. 1, Jan. 2006, pp. 617-623.  
M. Soljacic et al., "Photonic-crystal slow-light enhancement of nonlinear phase sensitivity", Journal of the Optical Society of America. B, vol. 19, No. 9, Sep. 2002, pp. 2052-2059.  
I. Marki et al., "Tunable microcavities in two dimensional photonic crystal waveguides", Optical MEMS and Their Applications Conference, IEEE/LEOS in Aug. 1-4, 2005, pp. 109-110.  
J. J. V. Olmos et al., "Photonic Add-Drop Filter Based on Integrated Photonic Crystal Structures", IEEE Journal of Selected Topics in Quantum Electronics, IEEE, 2009, pp. 1-6.

* cited by examiner

*Primary Examiner* — Sung Pak

(57) ABSTRACT

An optical switch is constituted of a wavelength filter and a control device. The wavelength filter includes a first waveguide exhibiting a transmission band of a predetermined basic mode and a second waveguide, arranged in at least one location of the first waveguide, exhibiting a transmission band with a cutoff frequency corresponding to a finite value included in the transmission band of the basic mode. A pair of optical couplers constituting a Mach-Zehnder interferometer is connected to opposite ends of a filter unit including the first waveguide and the second waveguide. When a plurality of wavelength filters is cascaded, these wavelength filters differ from each other in terms of the cutoff frequency of the second waveguide. The control device changes the cutoff frequency of the second waveguide within the transmission band of the first waveguide, thus adjusting the filtering band of the wavelength filter.

11 Claims, 11 Drawing Sheets

OPTICAL SWITCH

This application is the National Phase of PCT/JP2009/007256, filed Dec. 25, 2009, which claims priority on Japanese Patent Application No. 2008-332422 filed on Dec. 26, 2008, the entire content of which is incorporated herein by reference.

TECHNICAL FIELD

This invention relates to optical switches that adjust filtering bands of wavelength filters having photonic crystal structures so as to switch over transmission and non-transmission of light with a predetermined frequency band.

This application claims priority on Japanese Patent Application No. 2008-332422 filed on Dec. 26, 2008, the entire content of which is incorporated herein by reference.

BACKGROUND ART

Technologies regarding optical integrated circuits, in which optical components are integrated, such as transistor integrated circuits integrating electronic components have been developed. At present, optical circuits are constituted of optical components such as optical switches, wavelength filters and 3 dB couplers (optical couplers), which are connected together via optical waveguides such as optical fibers, wherein it is possible to significantly reduce the volume of optical circuits, power consumption and manufacturing cost if a plurality of optical components can be integrated on a small chip. Various optical integrated circuit technologies have been developed so far, Patent Document 1, for example, discloses an optical switch having a photonic crystal structure. The term "photonic crystal" (or "photonic crystalline") is a general term regarding the structure undergoing periodical variations of refractive indexes of light.

Photonic crystals exhibit various unique optical features owing to periodically structured refractive-index profiles, wherein one exemplary feature is a photonic band gap (PBG). Photonic crystals are able to transmit light therethrough, but photonic crystals adequately undergoing large periodical variations of refractive indexes do not transmit light with a specific frequency band. The frequency band (or the wavelength range) of light transmitted through photonic crystals is called a photonic band. The frequency band of light not transmitted through photonic crystals is called a photonic band gap (PBG) implying that it occurs between photonic bands. Some photonic crystal structures may allow photonic band gaps to be overlapped with a plurality of frequency bands. Photonic bands split by photonic band gaps are referred to as a first band, a second band, and a third band in an ascending order of frequency.

When micro defects destroying periodically structured refractive-index profiles (or the periodicity of refractive indexes) appear in photonic crystals, light whose frequency matches frequency bands of photonic band gaps is confined in micro defects. In this case, light whose frequency matches the sizes of micro defects is solely confined in micro defects; hence, photonic crystals serve as resonators. For this reason, photonic crystals can be utilized as frequency-selective (or wavelength-selective) filters (or optical filters).

When a plurality of micro defects is consecutively arranged in lines to form line defects in photonic crystals, light with frequency bands of photonic band gaps is confined in line defects, allowing light to propagate along line defects. That is, it is possible to utilize photonic crystals exhibiting line defects as optical waveguides. Optical waveguides composed of photonic crystals containing line defects are called line-defect waveguides.

It is possible to constitute optical functional elements such as optical modulators and optical switches by using either optical filters or optical waveguides or by combining both of them. That is, it is possible to constitute optical circuits by forming and connecting optical functional elements in photonic crystals. For this reason, photonic crystals are expected to be the platform of optical integrated circuits.

Photonic crystal structures actually available as the platform of optical integrated circuits are subjected to the following limitations.

When the effects of photonic band gaps are adopted in a three-dimensional space consisting of X-axis, Y-axis and Z-axis, refractive-index profiles of photonic crystals need to be periodically structured in a three-dimensional manner. However, since photonic crystals exhibiting three-dimensionally structured refractive-index profiles are complex and produced at high manufacturing cost, photonic crystals exhibiting two-dimensionally structured refractive-index profiles (hereinafter, referred to as two-dimensional photonic crystals) have been frequently used. Specifically, actually used two-dimensional photonic crystals with finite thickness are formed on substrates, wherein refractive-index profiles indicate periodicity in a plane, but refractive-index profiles do not indicate periodicity in the thickness direction. In this case, the PBG effect does not contribute to confinement of light in the thickness direction of substrates, but the total reflection due to differences of refractive indexes achieve such confinement of light.

The optical features of two-dimensional photonic crystals with finite thickness do not perfectly match the optical features of two-dimensional photonic crystals with infinite thickness. However, when refractive-index profiles in the thickness direction of two-dimensional photonic crystals with finite thickness are made with mirror symmetry in light-propagating regions, the optical features of two-dimensional photonic crystals with finite thickness match the optical features of two-dimensional photonic crystals with infinite thickness. The operational prediction of two-dimensional photonic crystals with infinite thickness can be made far easier than the operational prediction of two-dimensional photonic crystals with finite thickness. For this reason, it is easy to design devices using two-dimensional photonic crystals exhibiting refractive-index profiles with mirror symmetry.

So far, various structures regarding two-dimensional photonic crystals with finite thickness have been developed, wherein pillar-type tetragonal photonic crystals exhibit a property (i.e. low group-velocity property) in which light-propagating speed is slowed down in a broad range of frequency bands. Generally speaking, it is possible to constitute optical circuits of predetermined functions with short waveguide lengths by use of waveguides of low light-propagating speed. Therefore, line-defect waveguides using pillar-type tetragonal photonic crystals are applicable to optical integrated circuits.

FIG. 12 is a perspective view showing the structure of a line-defect waveguide composed of a pillar-type tetragonal photonic crystal 100 with finite thickness. In the pillar-type tetragonal photonic crystal 100, cylinders 102, composed of high dielectric material with finite heights, and cylinders 103 whose diameters are smaller than those of the cylinders 102 are arranged in a tetragonal lattice array in a low dielectric material 101. The tetragonal lattice array of the cylinders 102, 103 is likened to the lattice array of atoms in silicones or crystals and used for optical applications; hence, those crystals are called "photonic crystals". In this connection, the low dielectric material 101 and the cylinders 102, 103 are not necessarily composed of materials having crystal structures; hence, they can be composed of materials having amorphous structures.

In FIG. 12, the cylinders 102 are configured of completely periodic photonic crystals, whilst the cylinders 103 whose diameter is smaller than that of the cylinders 102 are regarded as defects that appear among the perfect crystals of the cylinders 102. To distinguish between the perfect crystals of the cylinders 102 and the defects of the cylinders 103, the former ones are referred to as "non-line-defect cylinders", whilst the latter ones as "line-defect cylinder" in the following description. In this connection, the line-defect cylinders 103 do not actually develop defects by themselves.

In the pillar-type tetragonal photonic crystals 100, the line-defect cylinders 103 are arranged in lines, whilst the non-line-defect cylinders 102 are formed around the linear alignment of the line-defect cylinders 103 so as to form a line-defect waveguide. In the line-defect waveguide of the pillar-type tetragonal photonic crystal 100, the linear alignment of the line-defect cylinders 103 is deemed equivalent to the core of a waveguide of a total-reflection confinement type, whilst the array of the non-defect cylinders 102, on the opposite sides of the linear alignment of the line-defect cylinders 103, is deemed equivalent to the clad of the waveguide. Similar to the waveguide of the total-reflection confinement type, which implements the waveguide functionality with the core and the clad, the line-defect waveguide implements the waveguide functionality with the line-defect cylinders 103 and the surrounding non-line-defect cylinders 102 as well as the low dielectric material 101. The line-defect waveguide, when appropriately designed and produced, may serve as a single-mode waveguide indicating a basic mode alone.

As described above, wavelength filters are produced by forming micro defects in photonic crystals; in actuality, however, structures for inputting/outputting light need to be added to wavelength filters. For instance, Patent Document 2 discloses a wavelength filter, which is produced by arranging line-defect waveguides in proximate to micro resonators or by partially inserting micro resonators into line-defect waveguides. The structure in which micro resonators are arranged in proximity to line-defect waveguides may serve as an optical switch that performs ON/OFF switching of light.

Generally speaking, the wavelength filter of the micro resonator type exhibits Lorentz transmission characteristics, which suffers from a problem in that a small full width at half maximum matches a transmission bandwidth. That is, the micro-resonator waveguide allows light of resonance frequency to be solely transmitted therethrough, whilst the micro-resonator waveguide does not allow light of other frequencies, other than the resonance frequency, to be transmitted therethrough. By shifting the resonance frequency of a micro resonator in the high frequency side or the low frequency side, it is possible to switch over the ON state, which allows light of the original resonance frequency to be transmitted, and the OFF state, which does not allow light of the original resonance frequency to be transmitted or which causes reflection or radiation of light (i.e. propagation loss); but the wavelength involving the ON/OFF switching should be solely limited to the resonance frequency. For this reason, a method for achieving broadband transmission characteristics or flattop property has been developed in such a way that a plurality of micro resonators with the same structure is cascaded and optically coupled together. This makes it possible to simultaneously switch over two frequencies, which appear in proximity to the lower-limit frequency and the upper-limit frequency in a specific transmission band. Specifically, the transmission band of the micro-resonator waveguide is shifted in the low frequency side, thus implementing switchover from the first state, which allows for transmission at the first frequency proximate to the upper-limit frequency of a transmission band, but which reflects (or does not allow for transmission) at the second frequency proximate to the lower-limit frequency of the transmission band, to the second state which allows for transmission at the second frequency.

PRIOR ART DOCUMENTS

Patent Documents

Patent Document 1: Japanese Patent Application Publication No. 2002-303836
Patent Document 2: Japanese Patent Application Publication No. 2004-295113

DISCLOSURE OF INVENTION

Problem to be Solved by the Invention

When micro resonators originally indicating narrow bands are significantly broadened in frequency bands to cope with two frequencies with quite different wavelengths in the foregoing structure in which a plurality of micro resonators is cascaded, it is necessary to increase the number of micro resonators coupled together, thus enlarging the overall size of an optical switch. Additionally, the foregoing structure is unable to simultaneously switch over two frequencies since the foregoing structure involves a single combination of switching in which one of two frequencies subjected to switching is opted for transmission while the other is opted for non-transmission. In short, the optical switch of the foregoing structure is able to handle the increased number of wavelengths but suffers from a problem in that the switching condition is limited.

This invention is made in light of the above circumstances, wherein the object thereof is to provide an optical switch which is able to perform a switching operation to switch over transmission and non-transmission (or reflection) with respect to light of two frequencies with a relatively broad gap between wavelengths. Additionally, this optical switch is able to independently perform a switching operation on light of two or more frequencies.

Means for Solving the Problem

An optical switch of this invention is constituted of a wavelength filter and a control device. The wavelength filter includes a first waveguide exhibiting a transmission band at a predetermined basic mode, and a second waveguide exhibiting a transmission band with a cutoff frequency corresponding to a finite value contained in the transmission band of the basic mode. A pair of optical couplers constituting a Mach-Zehnder interferometer is connected to opposite ends of a filter unit including the first waveguide and the second waveguide. The control device changes the cutoff frequency of the second waveguide within the transmission band of the first waveguide, thus adjusting a filtering band of the wavelength filter.

When a plurality of wavelength filters is cascaded, it is possible to change the cutoff frequency of the second waveguide differently per each waveguide filter.

Effect of the Invention

The wavelength filter, which is a constituent element of the optical switch of this invention, allows for transmission or reflection at the boundary corresponding to the cutoff frequency (or the cutoff wavelength) of the second waveguide, thus achieving a broadband optical filtering at the boundary of the cutoff frequency with a simple configuration. Since the control device changes the cutoff frequency of the second waveguide within the transmission band of the first waveguide, it is possible to achieve a switching operation on light of two frequencies independently.

MODE FOR CARRYING OUT THE INVENTION

Embodiment 1

Figure 1:
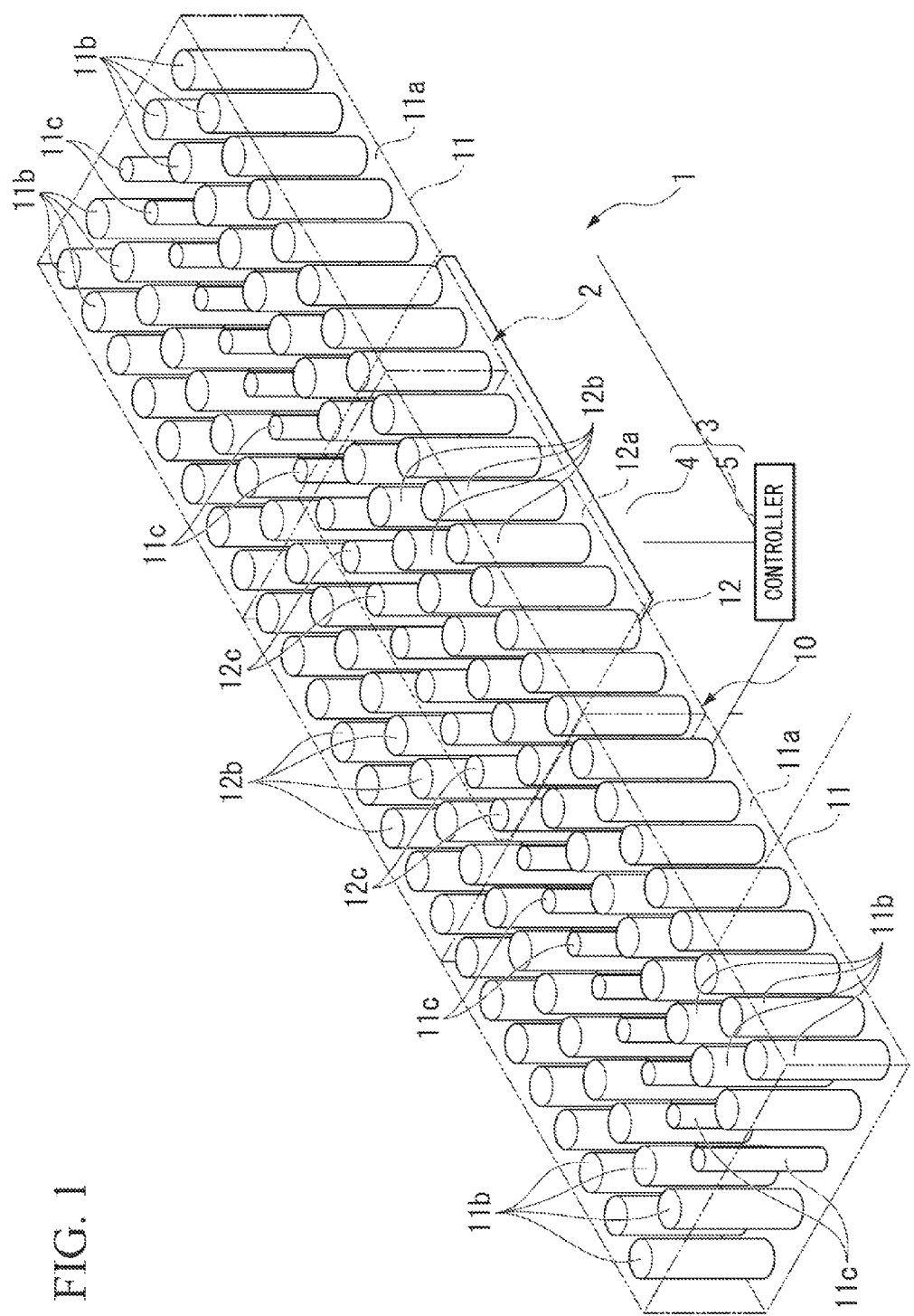
FIG. 1 A perspective view of an optical switch according to Embodiment 1 of this invention.

An optical switch 1 according to Embodiment 1 of this invention will be described with reference to FIGS. 1, 2, 3 and FIG. 4($a$), ($b$). As shown in FIG. 1, the optical switch 1 is constituted of a wavelength filter 2 which filters out light of a specific frequency range, and a control device 3 which adjusts a filtering band. The wavelength filter 2 includes a filter unit 10 which is constituted of a first waveguide 11 exhibiting a transmission band of a predetermined basic mode and a second waveguide 12 arranged in at least one location in the path of the first waveguide 11. The second waveguide 12 exhibits a basic-mode transmission band with a cutoff frequency corresponding to a finite value included in the basic-mode transmission band of the first waveguide 11. The control device 3 adjusts the filtering band by changing the cutoff frequency of the second waveguide 12 within the basic-mode transmission band of the first waveguide 11.

In Embodiment 1, both the first waveguide 11 and the second waveguide 12 are composed of a photonic crystal waveguide, i.e. a pillar-type tetragonal photonic crystal waveguide. The first waveguide 11 is constituted of a substrate 11$a$, composed of low dielectric material, and a plurality of non-line-defect cylinders 11$b$ and like-defect cylinders 11$c$, composed of material whose dielectric factor is higher than that of the substrate 11$a$, which are formed in cylindrical shapes and linearly aligned. Similarly, the second waveguide 12 is constituted of a substrate 12$a$, composed of low dielectric material, and a plurality of non-line-defect cylinders 12$b$ and line-defect cylinders 12$c$, composed of material whose dielectric factor is higher than that of the substrate 12$a$, which are formed in cylindrical shapes and linearly aligned. The non-line-defect cylinders and line-defect cylinders have been already discussed above.

Figure 2:
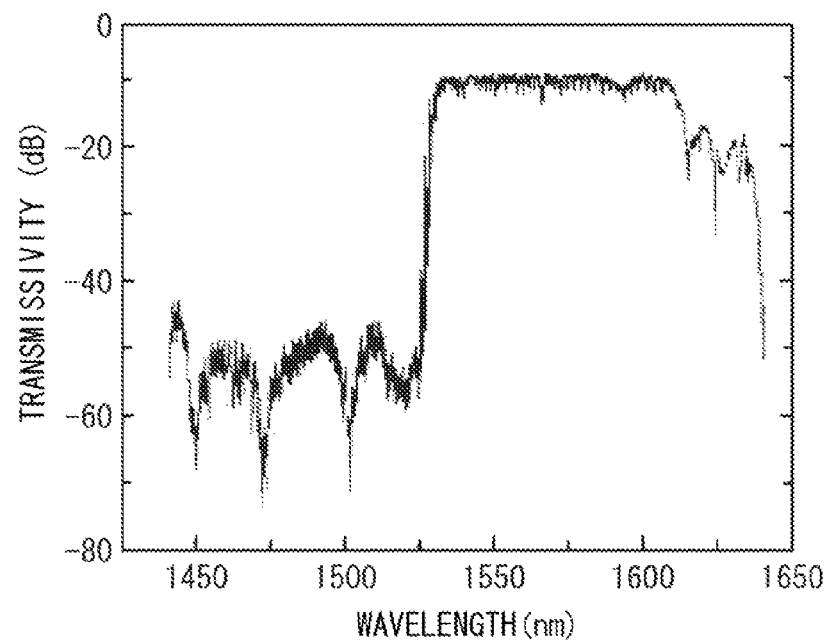
FIG. 2 A graph showing a transmission spectrum of a line-defect waveguide composed of a pillar-type tetragonal photonic crystal.
Figure 3:
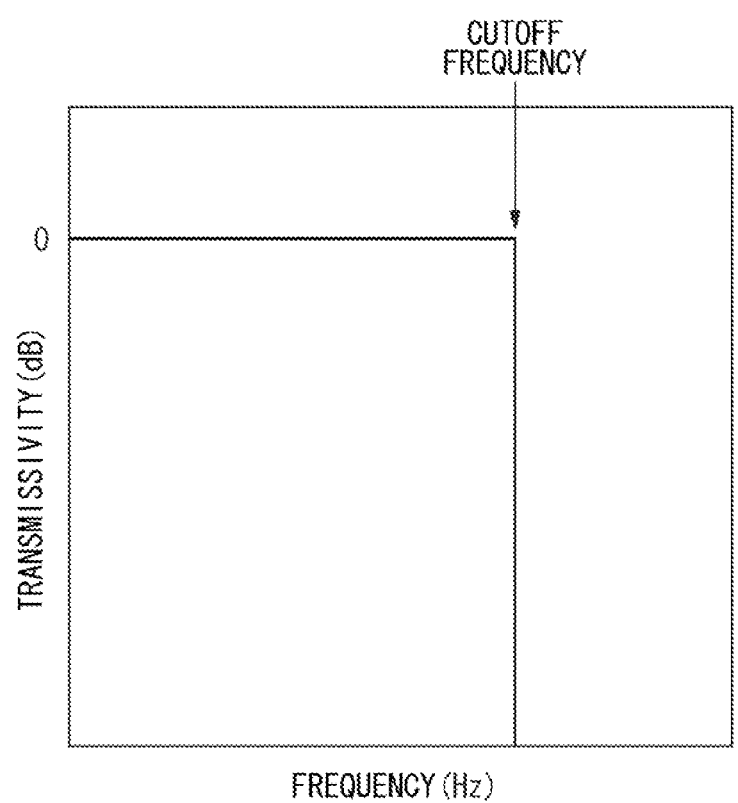
FIG. 3 A graph showing a transmission spectrum representing low-band filtering characteristic.
Figure 4:
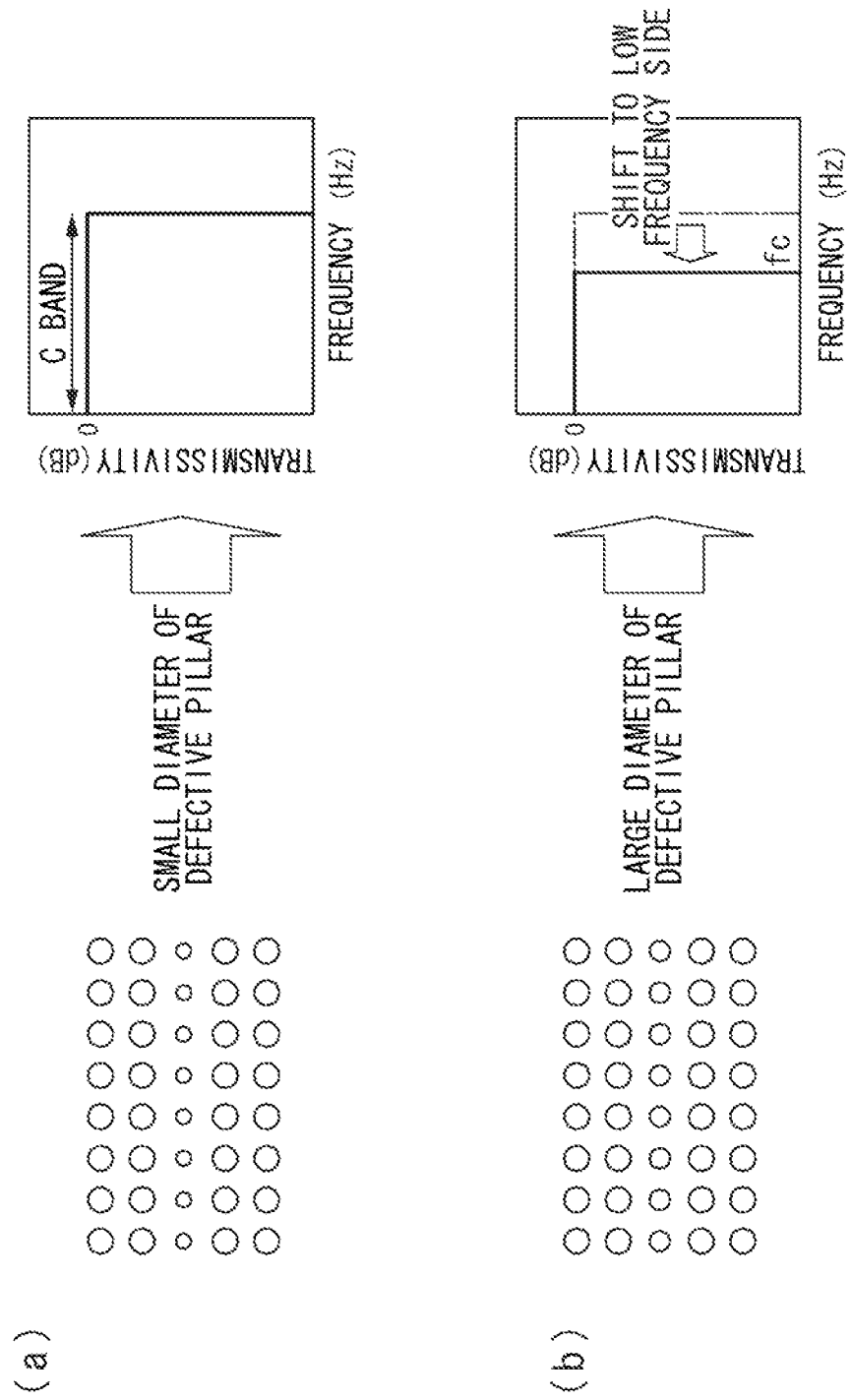
FIG. 4 Figures illustrating a method of changing a cutoff frequency of a pillar-type photonic crystal waveguide with a pillar sectional area of a line-defect cylinder, wherein (a) shows a waveguide transmitting light in the entire range of a C band, and (b) shows a waveguide providing a cutoff frequency in the middle of the C band.

FIG. 2 is a graph showing an example of a transmission spectrum actually measured with respect to a line-defect waveguide composed of a pillar-type tetragonal photonic crystal, wherein the horizontal line represents wavelength, and the vertical line represents transmissivity. The wavelength of this waveguide ranges from 1,525 to 1,600 nm with a cutoff wavelength of 1,525 nm in the shorter wavelength side (or in the high wavelength side). When incident light has a wavelength ranging from 1,450 nm to 1,570 nm, for example, the waveguide servers as a low-pass filter allowing for transmission of light whose wavelength is shorter (or longer) than the cutoff frequency of the waveguide. FIG. 3 is a graph showing a transmission spectrum corresponding to low-pass characteristic, wherein the horizontal axis represents frequency, and the vertical axis represents transmissivity.

Photonic crystal waveguides are advantageous in that they are freely designed in terms of the cutoff wavelength of their transmission bands. The principle of designing the cutoff frequency (or cutoff wavelength) of a transmission band of a waveguide composed of a pillar-type photonic crystal will be descried with reference to FIG. 4($a$), ($b$). In the case of a C band (whose wavelength ranges from 1,530 to 1,565 nm) belonging to an optical communication band, for example, it is possible to design a waveguide (FIG. 4($a$)) allowing for transmission of light in the entire range of the C band and a waveguide (FIG. 4($b$)) whose cutoff frequency resides in the middle of the C band by changing the pillar sectional area of line-defect cylinders. A low-pass filter is produced by interposing the second waveguide 12 between the first waveguides 11, wherein the first waveguide 11 acts like a line-defect waveguide allowing for transmission of light in the entire range of the C band, whilst the second waveguide 12 acts like a finite-length line-defect waveguide with a cutoff frequency fc in the middle of the C band.

As a method of changing the cutoff frequency (or cutoff wavelength) of the waveguide, it is possible to adopt various methods other than the foregoing method of changing the sectional area of the line-defect cylinders in the line-defect waveguide. For instance, it is possible to name a method of positioning lattices, on the opposite sides of the linear alignment of line-defect cylinders, to distance from or approach to line-defect cylinders, and a method of increasing or decreasing the pillar sectional areas close to the opposite sides of the central alignment of the line-defect cylinders.

As described above, the wavelength filter 2 is constituted using the first waveguide 11 allowing for transmission of light in the entire range of the C band and the second waveguide 12 providing the cutoff frequency in the middle of the C band. That is, the wavelength filter 1 includes a filter unit 10, which is constituted of the first waveguide 11 with the basic-mode transmission band equivalent to the C band and the second waveguide 12 arranged in at least one location in the path of the first waveguide 11, wherein the second waveguide 12 serves as a low-pass filter providing the basic-mode transmission band with the cutoff frequency fc (i.e. the finite value included in the C band). Both the first waveguide 11 and the second waveguide 12 are configured of a single-mode waveguide with an operating band equivalent to a part of or the entire range of the C band (indicating the basis-mode transmission band of the first waveguide 11), wherein the operating band includes the cutoff frequency fc of the second waveguide 12, and wherein the cutoff frequency fc is the cutoff frequency in the high frequency side.

In Embodiment 1 in which the second waveguide 12 is composed of a pillar-type photonic crystal, the cutoff frequency fc matches the upper-limit frequency of a transmission band, thus providing the functionality of a low-pass filter. When the second waveguide 12 is composed of an aperture-type photonic crystal, the cutoff frequency fc matches the lower-limit frequency of a transmission band, thus providing the functionality of a high-pass filter. In this constitution, the first waveguide 11 may be composed of an aperture-type photonic crystal.

Next, a method of mounting the wavelength filter 2 of Embodiment 1 on a photonic crystal will be described.

A photonic crystal is produced using an SIO wafer (Silicon On Insulator Wafer) as a substrate. The actually adopted SIO wafer includes an embedded oxide film with thickness of 2.0 µm and a silicon active layer with thickness of 1.0 µm. Additionally, the silicon active layer is non-doped.

First, the pattern shown in FIG. 1 is rendered using the electron beam exposure technology. When the wavelength of guided light in optical communication is set to 1.55 µm, the lattice constant is set to 0.4 µm, and the diameter of each cylinder is set to 0.24 µm. Additionally, the diameter of the line-defect cylinder 11c is set to 0.16 µm, and the diameter of the line-defect cylinder 12c is set to 0.22 µm.

Next, the silicon active layer is vertically processed according to the resist pattern rendered with anisotropic dry etching. The remaining resist pattern is removed using acetone; subsequently, an ultraviolet curing resin with a refractive index of 1.45, identical to that of the embedded oxide film, is applied to the interim product, which is cured using ultraviolet rays. Thus, it is possible to complete production of the wavelength filter 2.

The control device 3 is constituted of a heater 4 for heating the second waveguide 12 and a controller 5 for driving the heater 4. The controller 5 controls the heater 4 so as to heat the second waveguide 12 so that the constituent material of the second waveguide 12 is changed in refractive index, thus changing the cutoff frequency fc in the high frequency side or in the low frequency side. That is, when light whose frequency is close to the cutoff frequency fc of the second waveguide 12 is incident on the wavelength filter 2 while the control device 3 shifts the cutoff frequency fc close to the frequency of the incident light, it is possible to switch over transmission and non-transmission (reflection or radiation) of the incident light.

The constitution of the control device 3 for changing the cutoff frequency fc is not necessarily limited to the foregoing constitution using the thermooptic effect. As the method of changing the refractive index by heating the second waveguide 12, i.e. the method of causing the themooptic effect, light of a specific wavelength, which is absorbed as heat by the constituent material of the second waveguide 12, is incident on the second waveguide 12, or this light is irradiated onto the exterior of the wavelength filter 2. In addition to the method using the thermooptic effect, it is possible to employ the method using the electrooptic effect or the method using the magnetooptic effect for changing the cutoff frequency fc of the second waveguide 12. The method using the electrooptic effect is designed to change the refractive index by generating an electric field around the second waveguide 12 or by applying an electric current to the second waveguide 12, thus changing the cutoff frequency fc. The method using the magnetooptic effect is designed to change the refractive index by generating a magnetic field around the second waveguide 12, thus changing the cutoff frequency fc. Compared to the method using the electrooptic effect and the method using the magnetooptic effect, the method using the thermooptic effect is advantageous because of its ability of greatly changing the cutoff frequency and there being no limitation in selecting a constituent material for the second waveguide.

Embodiment 2

Next, an optical switch 1A according to Embodiment 2 of this invention will be described. Herein, parts identical to the same parts as Embodiment 1 are designated by the same reference numerals; hence, the description thereof will be omitted.

Figure 5:
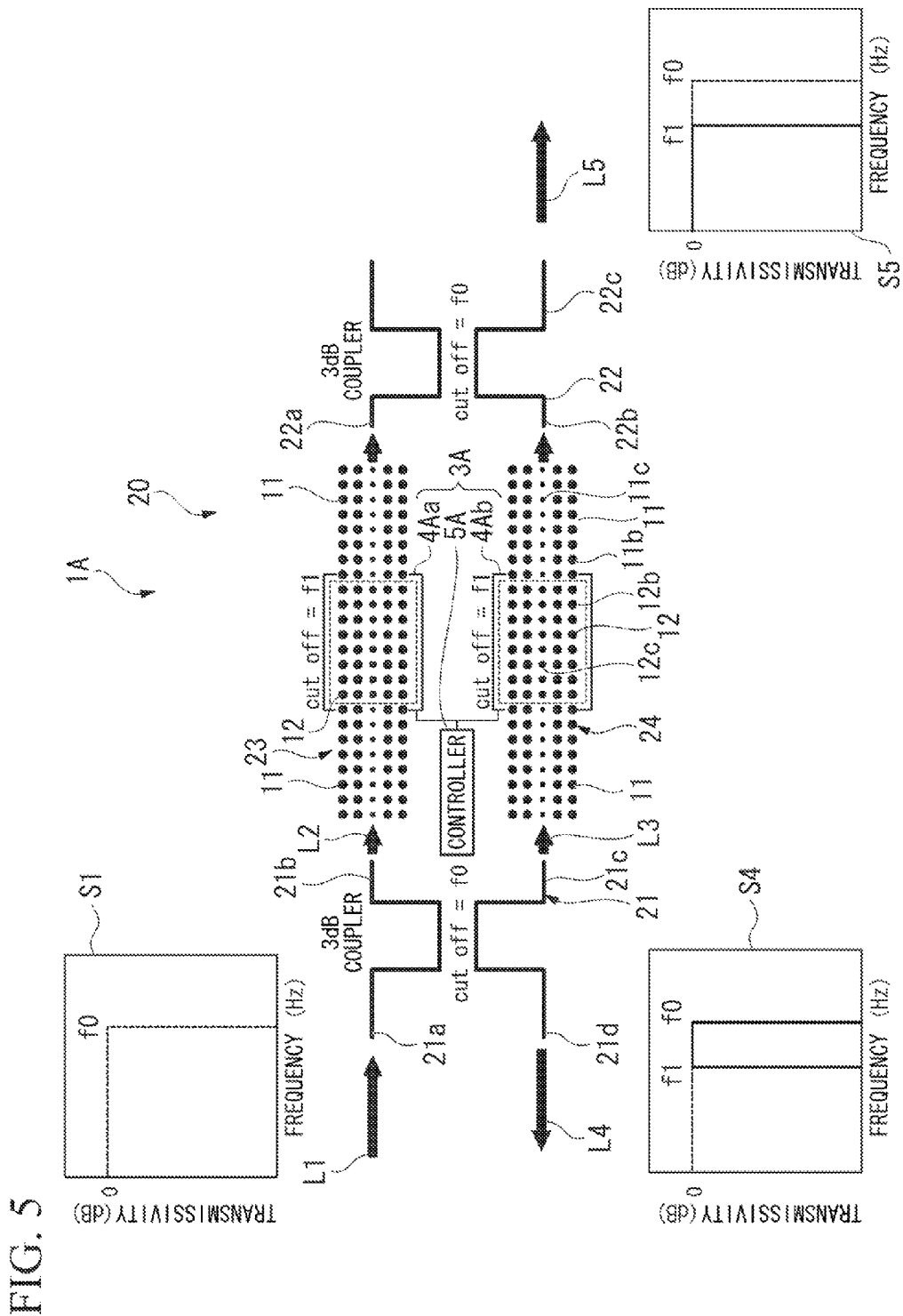
FIG. 5 Figures illustrating the configuration and operation of an optical switch, configured of a pair of 3 dB couplers and a filter unit, according to Embodiment 2 of this invention.

As shown in FIG. 5, the optical switch 1A of Embodiment 2 is constituted of a wavelength filter 20 and a control device 3A that adjusts the filtering band of the wavelength filter 20. The wavelength filter 20 is a directional coupler, which includes two filter units 23, 24 interposed between a pair of 3 dB couplers 21, 22. Both the filter units 23, 24 have the same constitution as the filter unit 10, which is constituted of the first waveguide 11 and the second waveguide 12. A pair of 3 dB couplers 21, 22 constitutes a Mach-Zehnder interferometer so that the opposite ends of the filter units 23, 24 are connected to the 3 dB couplers 21, 22 respectively. FIG. 5 diagrammatically shows the 3 dB couplers 21, 22 as solid-lined waveguides; but the 3 dB couplers 21, 22 may be composed of a photonic crystal waveguide. It is preferable that the 3 dB couplers 21, 22 exhibit a sufficiently small wavelength dependency within the operating frequency range of the wavelength filter 20.

The basic constitution of the control device 3A is equivalent to that of the control device 3. That is, the control device 3A is constituted of a first heater 4Aa for heating the second waveguide 12 of the filter unit 23, a second heater 4Ab or heating the second waveguide 12 of the filter unit 24, and a controller 5A for driving the first heater 4Aa and the second heater 4Ab independently. In this connection, the control device 3A is not necessarily limited to this constitution; hence, it is possible to adopt the other constitution described in Embodiment 1.

Next, the operation of the optical switch 1A will be described.

Similar to the filter unit 10, both the filter units 23, 24 constitute a low-pass filter with a cutoff frequency f1, wherein the 3 dB couplers 21, 22 exhibits a cutoff frequency f0 in the high frequency side. Herein, when input light L1 with a frequency fi (where fi<f0) is incident on a port 21a of the 3 dB coupler 21, the input light L1 braches into two branch lights L2, L3 while being transmitted through the 3 dB coupler 21. The branch light L2 is supplied to the filter unit 23 via a port 21b, whilst the branch light L3 is supplied to the filter unit 24 via a port 21c.

The wavelength filter 20 performs the following operation in response to the high/low relationship between the frequency fi of the input light L1, the upper-limit cutoff frequency f0 of the 3 dB couplers 21, 22, and the cutoff frequency f1 of the filter units 23, 24.

First, when the frequency fi of the input light L1 satisfies f1<fi<f0, the branch lights L2, L3 are not allowed to pass through but reflect at the filter units 23, 24 since the frequency fi of the input light L1 is higher than the cutoff frequency f1 of the filter units 23, 24. The reflected branch lights L2, L3 are forced to return to the 3 dB coupler 21, so that unless their phases change, they are inversely transmitted through the 3 dB coupler 21 and output from a port 21d as output light L4.

When the frequency fi of the input light L1 satisfies fi<f1, the branch lights L2, L3 are transmitted through the filter units 23, 24 and supplied to the 3 dB coupler 22 via ports 22a, 22b since the frequency fi of the input light L1 is lower than the cutoff frequency f1 of the filter units 23, 24. Subsequently, the branch lights L2, L3 are transmitted through the 3 dB coupler 22, so that unless their phases change, they are output from a port 22c as output light L5.

According to the operation of the wavelength filter 20, when the input light L1 with a frequency spectrum S1 is incident on the port 21a of the MB coupler 21, the output light L4 with a frequency spectrum S4 is output from the port 21d of the 3 dB coupler 21, whilst the output light L5 with a frequency spectrum S5 is output from the port 22c of the 3 dB coupler 22. That is, the wavelength filter 20 acts as a Mach-Zehnder interferometer so that the input light L1 is split into the output light L4 in the high frequency side and the output light L5 in the low frequency side at the boundary of the cutoff frequency f1.

When the wavelength filter 20 is driven in a reverse direction, it serves as a multiplexer. In this case, when light with a frequency fia (where f1<fia<f0) is incident on the port 21d of the 3 dB coupler 21 while light with a frequency fib (where fib<f1) is simultaneously incident on the port 22c of the 3 dB coupler 22, lights with the frequencies fia, fib are multiplexed and output from the port 21 a of the 3 dB coupler 21.

In either the demultiplexing operation and the multiplexing operation, upon incidence of input light whose frequency is close to the cutoff frequency f1 of the second waveguide 12, included in the filter units 23, 24 of the wavelength filter 20, the control device 3A changes the cutoff frequency f1 to be proximate to the frequency of the input light, so that the optical switch 1A can perform a switching operation for switching over transmission and non-transmission (e.g. reflection or radiation) of the input light.

Embodiment 3

Next, an optical switch 1B according to Embodiment 3 of this invention will be described with reference to FIGS. 6 to 11. Herein, parts identical to those of Embodiment 1 and Embodiment 2 are designated by the same reference numerals; hence, a description thereof will be omitted.

Figure 6:
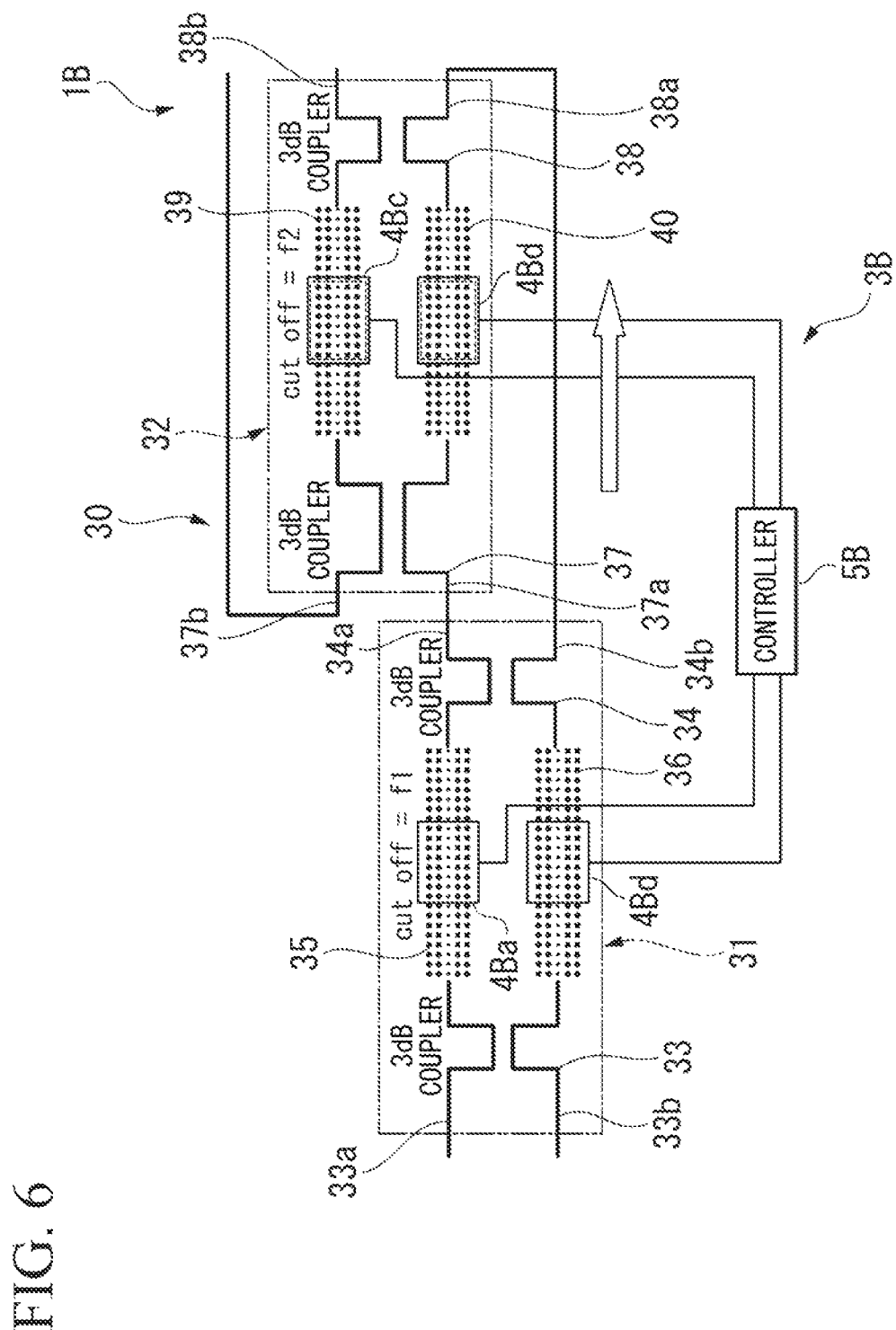
FIG. 6 Figures illustrating the configuration and operation of an optical switch, configured of a first wavelength filter and a second wavelength filter, according to Embodiment 3 of this invention.

As show in FIG. 6, the optical switch 1B according to Embodiment 3 is constituted of a wavelength filter 30 and a control device 3B for adjusting a filtering band of the wavelength filter 30. The wavelength filter 30 includes the first wavelength filter 31 and the second wavelength filter 32, each constituting a Mach-Zehnder interferometer. Similar to the wavelength filter 20 of Embodiment 2, the first wavelength filter 31 is constituted of a pair of 3 dB couplers 33, 34 and a pair of filter units 35, 36. Similarly, the second wavelength filter 32 is constituted of a pair of 3 dB couplers 37, 38 and a pair of filter units 39, 40. The wavelength filter 30, details of which will be described below, serves as a band-pass filter transmitting light with a frequency fi (where f2<fi<f1<f0).

In the wavelength filter 30, the cutoff frequency f1 of the second waveguide, included in the filter units 35, 36 of the first wavelength filter 31, differs from the cutoff frequency f2 of the second waveguide, included in the filter units 39, 40 of the second wavelength filter 32, with the relationship of f2<f1.

In the first wavelength filter 31, the 3 dB coupler 33, connected to one end of each of the filter units 35, 36, is able to input/output light via ports 33a, 33b. Ports 34a, 34b of the 3 dB coupler 34, connected to the other end of each of the filter units 35, 36, are respectively connected to ports 37a, 38a of the 3 dB couplers 37, 38 of the second wavelength filter 32.

The port 37a of the 3 dB coupler 37, connected to one end of each of the filer units 39, 40, is connected to the port 34a of the 3 dB coupler 34, whilst the port 37b is able to input/output light. On the other hand, the port 38a of the 3 dB coupler 38, connected to the other end of each of the filter units 39, 40 of the second wavelength filter 32, is connected to the port 34b of the 3 dB coupler 34, whilst the port 38b is able to input/output light.

The 3 dB couplers 33, 34 and the 3 dB coupler 38 are each arranged with center symmetry, wherein the lengths of the parallel waveguides constituting the 3 dB couplers 33, 34, 38 are determined such that output light will be provided at a waveguide disposed at a position (i.e. a point-symmetry position) on a diagonal line relative to an input waveguide. In the 3 dB coupler 37, however, the lengths of the parallel waveguides constituting the 3 dB coupler 37 are determined such that output light is provided at a waveguide, which is not disposed at a position on the diagonal line relative to the input waveguide but at a position with plane symmetry to a plane vertically crossing the input waveguide at its center position.

The basic constitution of the control device 3B is designed similarly to the control device 3. Specifically, the control device 3B is constituted of a first heater 4Ba and a second heater 4Bb, respectively heating the second waveguides 12 included in the filter units 35, 36 of the first wavelength filter 31, a third heater 4Bc and a fourth heater 4Bd, respectively heating the second waveguides 12 included in the filter units 39, 40 of the second wavelength filter 32, and a controller 5B for driving these heaters 4Ba, 4Bb, 4Bc, 4Bd. In this connection, the control device 3B is not necessarily limited to this constitution; hence, it is possible to adopt the other constitution described in Embodiment 1. Although the same control device 3B is shared to control the heaters 4Ba, 4Bb for changing the cutoff frequency f1 of the first wavelength filter 31 and the heaters 4Bc, 4Bd for changing the cutoff frequency f2 of the second wavelength filter 32, it is possible to control the cutoff frequencies f1, f2 with independent control devices.

Next, the outline of the operation of the optical switch 1B will be described.

Figure 7:
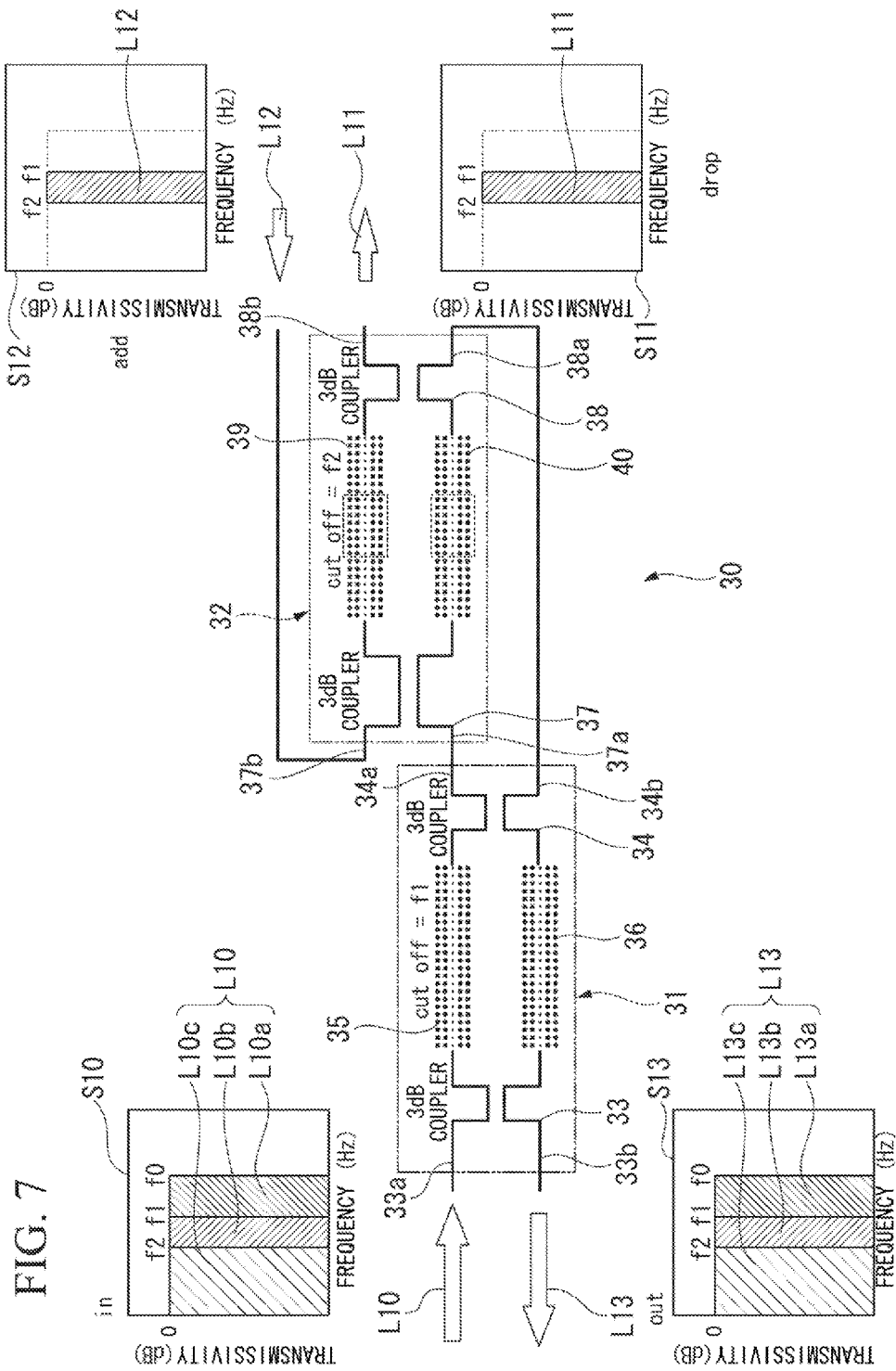
FIG. 7 Figures illustrating transmission paths and frequency spectrum, regarding input lights L10, L12 and output lights L11, L13, in the optical switch according to Embodiment 3.

FIG. 7 shows transmission characteristics of the wavelength filter 30. Herein, first input light L10 has a frequency spectrum S10, which includes lights L10a, L10b, L10c with different wavelengths below the frequency M. When the first input light L10 is incident on the port 33a of the 3 dB coupler 33, the light L10b with a frequency fi where f2<fi<f1 is transmitted from the first wavelength filter 31 to the second wavelength filter 32, so that output light L11 with a spectrum S11 is output from the port 38b of the 3 dB coupler 38. Within the first input light L10, the light L10a with the frequency fi where f1<fi<f0 is reflected at the first wavelength filter 31 and output as lights L13a, L13c from the port 33b of the 3 dB coupler 33. Additionally, the light L10c with the frequency fi where fi<f2 is sequentially transmitted through the first wavelength filter 31 and the second wavelength filter 32 and then transmitted through the first wavelength filter 31 again, so that the light L13c is output from the port 33b of the 3 dB coupler 33.

On the other hand, the second input light L12 with the frequency fi where f2<fi<f1 and a frequency spectrum S12 is incident on the port 38b of the 3 dB coupler 38 of the second wavelength filter 32. The second input light L12 is transmitted through the second wavelength filter 32 and the first wavelength filter 31, so that the light L13b is output from the port 33b of the 3 dB coupler 33. Thus, the lights L13a, L13c corresponding to the lights L10a, L10c and the light L13b corresponding to the second input light L12 are multiplexed into the output light L13, which is output from the port 33b of the 3 dB coupler 33 of the first wavelength filter 31. The output light L13 indicates a frequency spectrum S13 which is a combination of frequency spectrums of the light L10a, L10c and frequency spectrum of the second input light L12.

As described above, the wavelength filter 30 servers as an optical add/drop filter.

Next, the operation of the wavelength filter 30 will be described in detail with reference to FIGS. 8 to 11.

Figure 8:
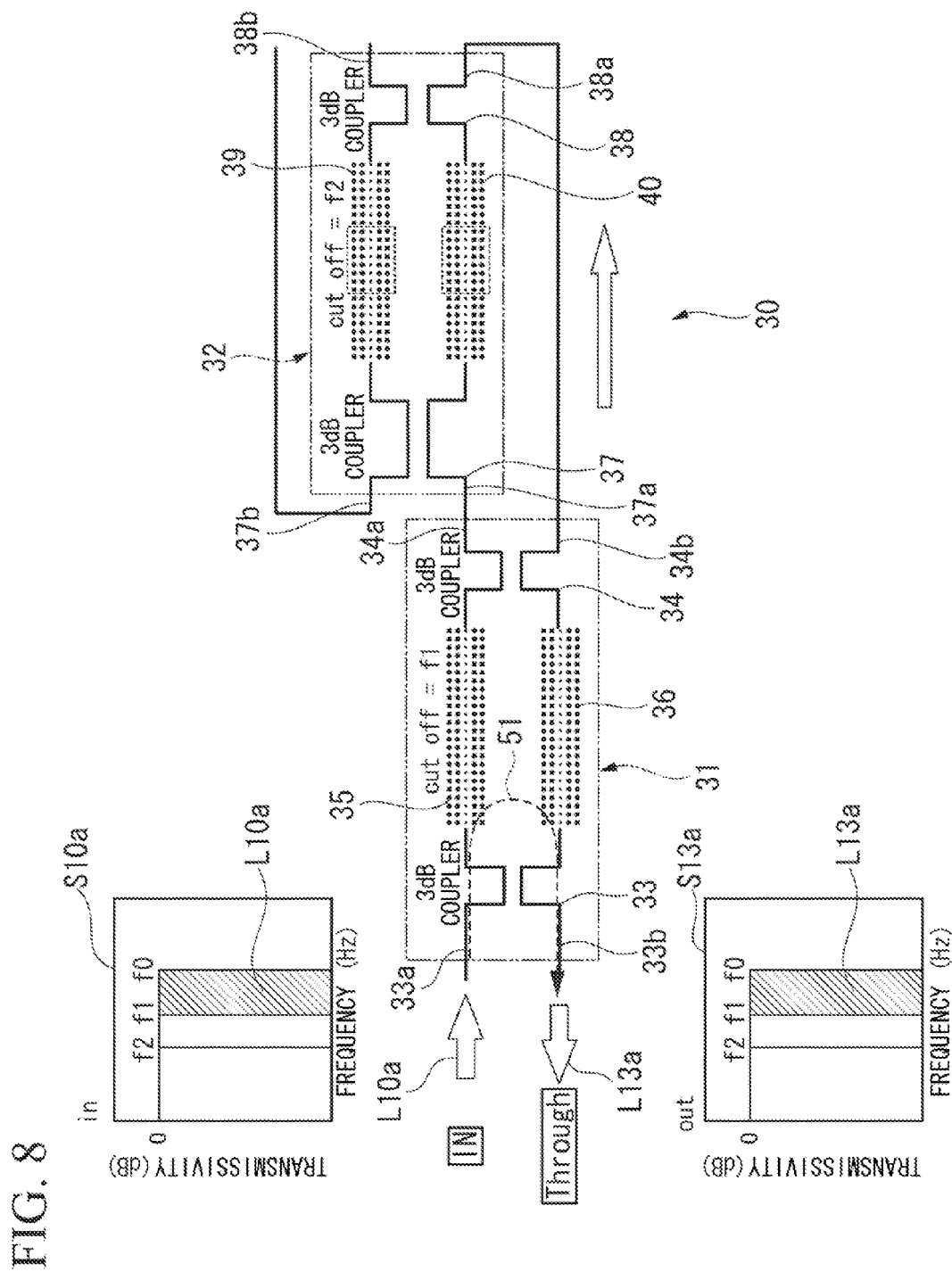
FIG. 8 Figures illustrating a transmission path and frequency spectrum when light L10$a$ constituting input light L10 is incident on the optical switch according to Embodiment 3.

When the light L10a with the frequency fi where f1<fi<f0 and frequency spectrum S10a is incident on the port 33a of the 3 dB coupler 33, the light L10a is transmitted through the first wavelength filter 31 along a transmission path 51 denoted by a dotted line in FIG. 8. FIG. 8 diagrammatically shows the operation in which the light L10a is incident on the port 33a of the 3 dB coupler 33 so that the light L13a is correspondingly output from the port 33b. In actuality, however, the light L10a, after passing through the 3 dB coupler 33, is branched into two lights and supplied to the filter units 35, 36. Subsequently, the branch lights derived from the light L10a are reflected at the filter units 35, 36, so that the light L13a with a frequency spectrum S13a is output from the port 33b of the 3 dB coupler 33.

Figure 9:
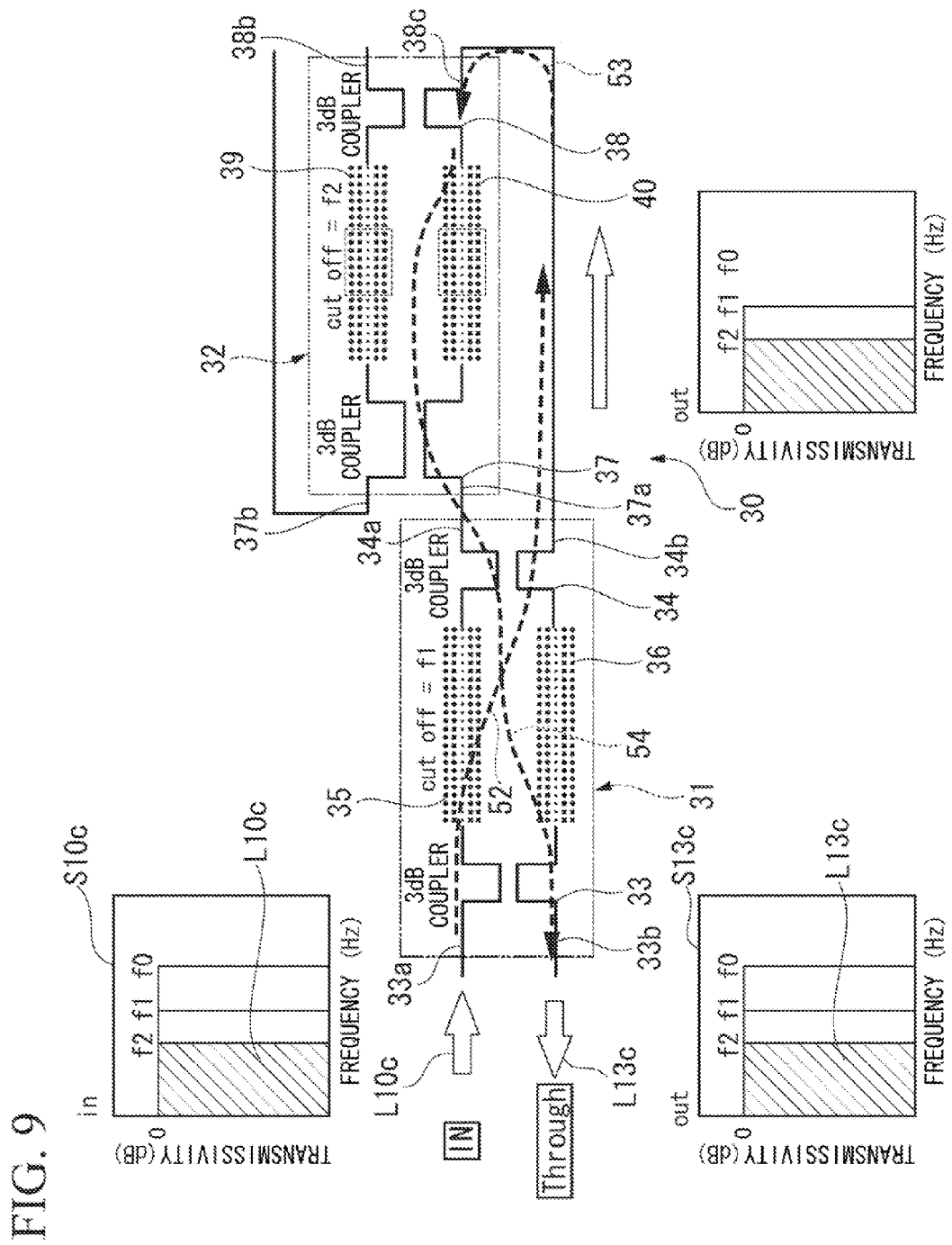
FIG. 9 Figures illustrating optical paths and a frequency spectrum when light L10$c$ constituting input light L10 is incident on the optical switch according to Embodiment 3.

When the light L10c with the frequency fi where fi<f2 and a frequency spectrum S10c is incident on the port 33a of the 3 dB coupler 33, the light L10c is transmitted through the first wavelength filter 31 and the second wavelength filter 32 via transmission paths 52, 53, 54 denoted by dotted lines in FIG. 9. FIG. 9 diagrammatically shows the operation in which the light L10c is incident on the port 33a of the 3 dB coupler 33 of the first wavelength filter 31 and output as the light L13c from the port 33b. In actuality, however, the light L10c, after passing through the 3 dB coupler 33, is split into two lights, which are supplied to the filter units 35, 36. This transmitted light is output from the port 34b of the 3 dB coupler 34 and then transmitted to the port 38a of the 3 dB coupler 38. The input light of the 3 dB coupler 38 is split into two lights, which are transmitted through the filter units 39, 40 of the second wavelength filter 32, output from the port 37a of the 3 dB coupler 37, and then input into the port 34a of the 3 dB coupler 34. The transmitted light of the 3 dB coupler 34 is split into two lights, which are transmitted through the filter units 35, 36 of the first wavelength filter 31 and then output from the port 33b of the 3 dB coupler 33 as the light L13c with a frequency spectrum S13c.

Figure 10:
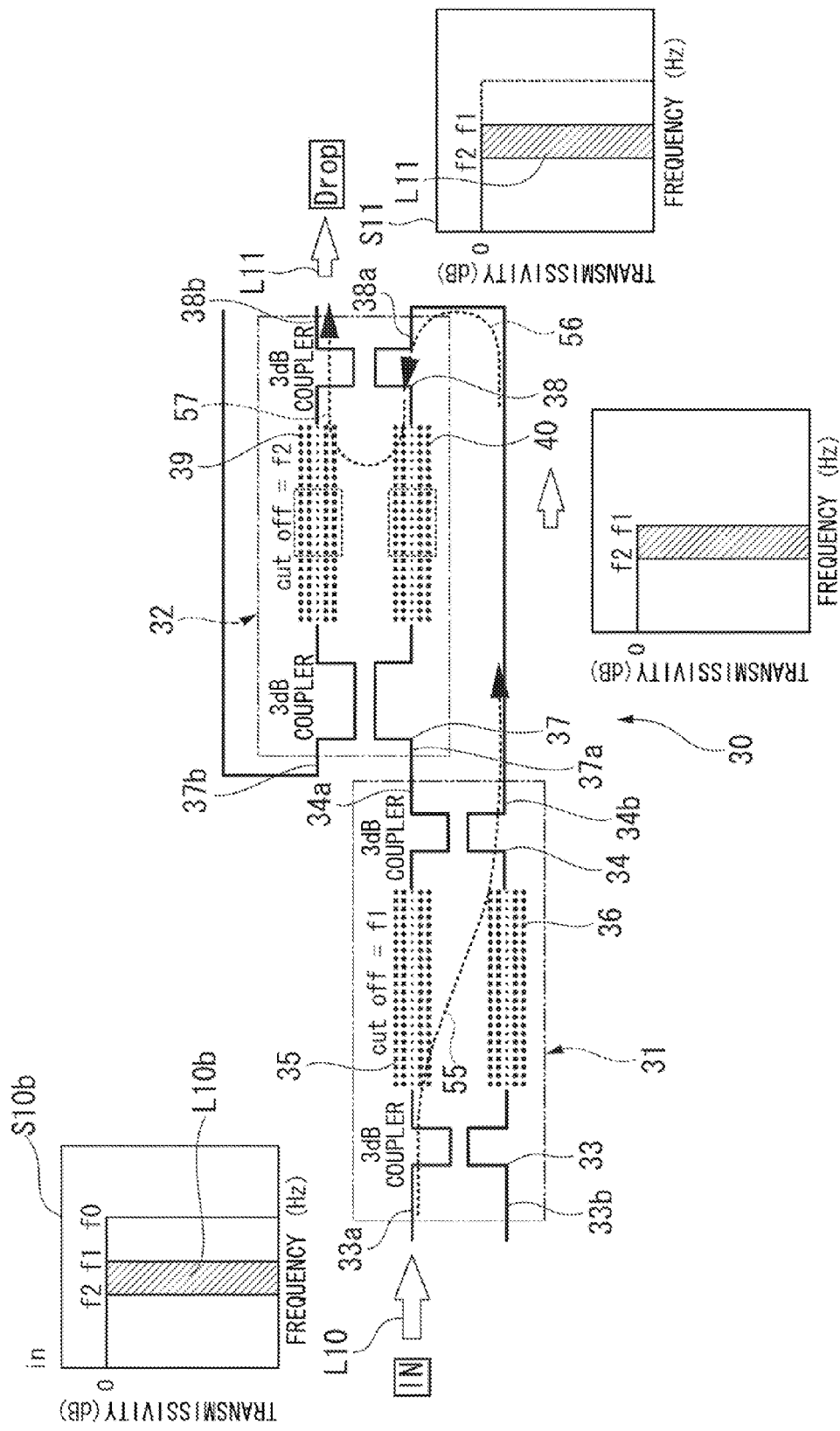
FIG. 10 Figures illustrating transmission paths and a frequency spectrum when light L10$b$ constituting input light L10 is incident on the optical switch according to Embodiment 3.

When the light L10b with the frequency fi where f2<fi<f1 and a frequency spectrum SI Ob is incident on the port 33a of the 3 dB coupler 33, the light L10b is transmitted through the first wavelength filter 31 and the second wavelength filter 32 via transmission paths 55, 56, 57 denoted by dotted lines in FIG. 10. FIG. 10 diagrammatically shows that the light L10b is incident on the port 33a of the 3 dB coupler 33 of the first wavelength filter 31 and then output from the port 38b of the 3 dB coupler 38 of the second wavelength filter 32 as the output light L11. Specifically, the light 10b is transmitted through the 3 dB couplers 33 and 34 of the first wavelength filter 31 and then input to the port 38a of the 3 dB coupler 38. The input light of the 3 dB coupler 38 is split into two lights and reflected at the filter units 39, 40, so that the output light S11 with a frequency spectrum S11 is output from the port 38b.

Figure 11:
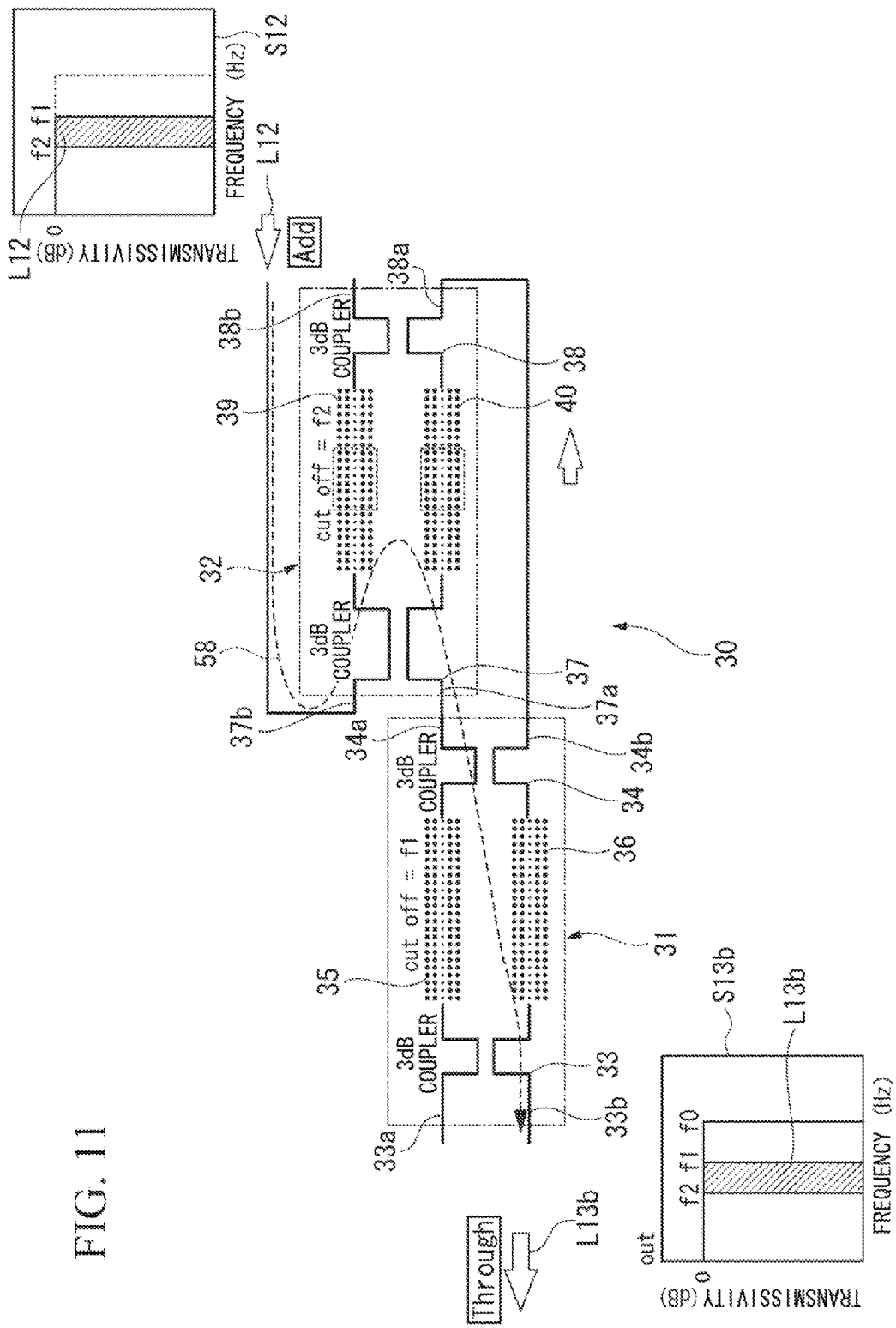
FIG. 11 Figures illustrating a transmission path and frequency spectrum when input light L12 is incident on the optical switch according to Embodiment 3.
Figure 12:
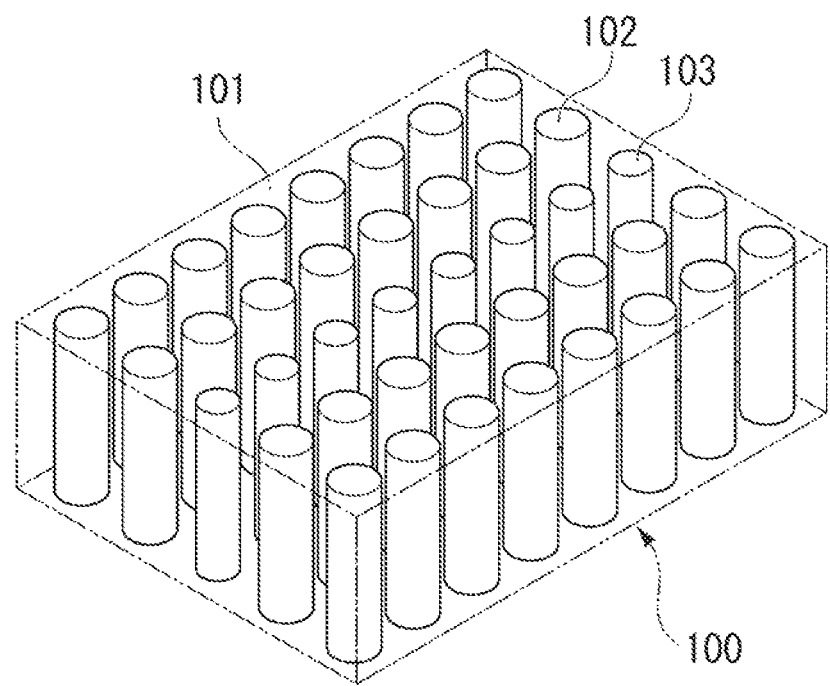
FIG. 12 A perspective view showing the structure of a line-defect waveguide composed of a pillar-type tetragonal photonic crystal with finite thickness.

When the input light L12 with the frequency fi where f2<fi<f1 and a frequency spectrum S12 is incident on the port 38b of the 3 dB coupler 38, the input light L12 is transmitted through the second wavelength filter 32 and the first wavelength filter 31 via a transmission path 58 denoted by a dotted line in FIG. 11. FIG. 11 diagrammatically shows that the input light L12 is incident on the port 38b of the 3 dB coupler 38 of the second wavelength filter 32 and then output from the port 33b of the 3 dB coupler 33 of the first wavelength filter 31 as the output light L13b. Specifically, the input light L12 is transmitted to the port 37b of the 3 dB coupler 37 of the second wavelength filter 32 and then split into two lights via the 3 dB coupler 37, so that two lights are respectively supplied to the filter units 39, 40. The transmitted light is reflected at the filter units 39, 40 and then output from the port 37a of the 3 dB coupler 37. Subsequently, the transmitted light is supplied to the port 34a of the 3 dB coupler 34 of the first wavelength filter 31, transmitted through the filter units 35, 36, and then output from the port 33b of the 3 dB coupler 33 as the light L13b.

As described above, the wavelength filter 30 of Embodiment 3 serves as a broadband wavelength filter (i.e. an add/drop filter) without using a narrowband resonator. Additionally, the wavelength filter 30 can be easily designed without changing the entire circuitry area, since the cutoff frequency f1 corresponds to the cutoff frequency of the second waveguides of the filter units 35, 36 of the first wavelength filter 31 whilst the cutoff frequency f2 corresponds to the cutoff frequency of the second waveguides of the filter units 39, 40 of the second wavelength filter 32. Unlike the resonator-type wavelength filter, the wavelength filter 30 is able to easily perform an add/drop operation on light of a specific frequency band.

The wavelength filter 30 inputs incident lights whose frequencies are close to the cutoff frequency f1 of the filter units 35, 36 of the first wavelength filter 31 and the cutoff frequency f2 of the filter units 39, 40 of the second wavelength filter 32, wherein the control device 3B changes the cutoff frequencies f1, f2 to be proximate to two frequencies of incident lights. Thus, the optical switch 1B performs a switching operation to switch over transmission and non-transmission (i.e. reflection or radiation) on incident lights with two frequencies respectively equivalent to the cutoff frequencies f1, f2. When a plurality of optical switches 1B is cascaded so as to set different optical frequencies (or optical wavelengths) subjected to switching, it is possible to perform optical switching on three or more frequencies independently.

Heretofore, various embodiments regarding optical switches using wavelength filters composed of photonic crystals have been described; but this invention is not necessarily limited to these embodiments. For instance, it is possible to displace circular cylinders other than line-defect cylinders constituting photonic crystals, or it is possible to increase or decrease their sectional areas. In this connection, pillar shapes are not necessarily limited to circular cylinders; hence, it is possible to employ other shapes such as quadratic prisms and octagonal prisms.

This invention is not necessarily limited to the foregoing embodiments. These embodiments are illustrative and not restrictive; hence, they can be further modified within the scope of the invention as defined in the appended claims.

INDUSTRIAL APPLICABILITY

This invention provides an optical switch with a simple and small-size structure, i.e. an optical switch which is able to perform a switching operation on transmission and non-transmission (or reflection) because the cutoff frequency of a wavelength filter with broadband optical transmission/reflection property is controlled to be proximate to the frequency of the incident light; hence, this invention is applicable to various optical integrated circuits and optical transmission technologies.

DESCRIPTION OF THE REFERENCE NUMERALS

1 Optical switch (Embodiment 1)
1A Optical switch (Embodiment 2)
1B Optical switch (Embodiment 3)
2 Wavelength filter
3 Control device
3A Control device
3B Control device
10 Filter unit
11 First waveguide
12 Second waveguide
20 Wavelength filter
21 3 dB coupler
22 3 dB coupler
30 Wavelength filter
31 First wavelength filter
32 Second wavelength filter

The invention claimed is:

1. An optical switch comprising:
a wavelength filter including a first waveguide and a second waveguide, wherein the second waveguide is disposed at a single position or each of plural positions in the first waveguide except for its opposite ends, and wherein the second waveguide exhibits a basic-mode transmission band with a cutoff frequency having a finite value which is contained in a basic-mode transmission band of the first waveguide; and
a cutoff frequency controller that controls the cutoff frequency,
wherein each of the first waveguide and the second waveguide comprises a single-mode waveguide with an operating band corresponding to a part of or the entirety of the basic-mode transmission band of the first waveguide and including the cutoff frequency alone.

2. The optical switch according to claim 1, wherein the cutoff frequency of the second waveguide is set in a high frequency side.

3. The optical switch according to claim 1, wherein the second waveguide comprises a photonic crystal waveguide.

4. The optical switch according to claim 3, wherein the photonic crystal waveguide forming the second waveguide comprises a pillar-type photonic crystal waveguide.

5. The optical switch according to claim 1, wherein the first waveguide comprises a photonic crystal waveguide.

6. The optical switch according to claim 5, wherein the photonic crystal waveguide forming the first waveguide comprises a pillar-type photonic crystal waveguide.

7. The optical switch according to claim 1, wherein the first waveguide and the second waveguide are collectively disposed at one or more position between a pair of optical couplers mutually coupled together.

8. The optical switch according to claim 7, wherein the pair of optical couplers constitutes a Mach-Zehnder interferometer.

9. The optical switch according to claim 8, wherein the Mach-Zehnder interferometer comprises a photonic crystal waveguide.

10. The optical switch according to claim 9, wherein the photonic crystal waveguide constituting the Mach-Zehnder interferometer comprises a pillar-type photonic crystal waveguide.

11. An optical switch according to claim 8 further comprising two or more Mach-Zehnder interferometers mutually coupled together, wherein the second waveguides included in at least two Mach-Zehnder interferometers differ from each other in terms of the cutoff frequency.

* * * * *